(12) United States Patent  (10) Patent No.: US 8,794,192 B1
Olmo  (45) Date of Patent: Aug. 5, 2014

(54) MOVEMENT RESTRAINT DEVICE FOR ANIMALS

(71) Applicant: Patti Olmo, Roseville, CA (US)

(72) Inventor: Patti Olmo, Roseville, CA (US)

(*) Notice: Subject to any disclaimer, the term of this patent is extended or adjusted under 35 U.S.C. 154(b) by 0 days.

(21) Appl. No.: 13/902,884

(22) Filed: May 27, 2013

(51) Int. Cl.
*A01K 15/04* (2006.01)

(52) U.S. Cl.
USPC ............................................ 119/856; 119/815

(58) Field of Classification Search
USPC .......................... 119/856, 814, 815, 792, 907
See application file for complete search history.

(56) References Cited

U.S. PATENT DOCUMENTS

| | | | | |
|---|---|---|---|---|
| 1,163,090 A * | 12/1915 | Johnson | .......................... | 119/815 |
| 2,941,507 A * | 6/1960 | Becker et al. | .................. | 119/815 |
| 4,286,547 A * | 9/1981 | Nuwbauer et al. | ............ | 119/815 |
| 4,329,942 A * | 5/1982 | King | ............................... | 119/814 |
| 4,799,458 A * | 1/1989 | Goshorn et al. | ............... | 119/815 |
| 5,896,831 A * | 4/1999 | Alpert | ............................. | 119/856 |
| 6,679,198 B1 * | 1/2004 | LaGarde | ......................... | 119/792 |
| 6,976,453 B2 * | 12/2005 | Goudal | .......................... | 119/815 |
| 7,458,339 B1 * | 12/2008 | Peirano | ......................... | 119/815 |
| 2004/0045512 A1 * | 3/2004 | Goudal | .......................... | 119/850 |

* cited by examiner

*Primary Examiner* — Yvonne Abbott
(74) *Attorney, Agent, or Firm* — Gulf Coast Intellectual Property Group

(57) ABSTRACT

An animal movement restraint operable to inhibit the animal engaged with the restraint from moving their head in a lateral and rearward direction. The animal movement restraint further includes a neckband surroundably mounted to the neck of the animal. A lower torso strap is further included and is circumferentially secured to the lower torso of the animal and is generally immovable. A first side strap and a second side strap are operably coupled intermediate the neckband and the lower torso strap. The first side strap and second side strap are adjustable in length and operable to be tightened so as to reduce the movement of the head of the animal. A mounting strap is secured intermediate the first side strap and second side strap extending over the back of the animal.

15 Claims, 2 Drawing Sheets

MOVEMENT RESTRAINT DEVICE FOR ANIMALS

FIELD OF THE INVENTION

The present invention relates to animal health, more specifically but not by way of limitation, an apparatus operable to inhibit the movement of an animal so as to prevent the animal from contacting an area of their body that requires healing due to circumstances such as but not limited to surgery or trauma.

BACKGROUND

It is well know in the art of veterinary care that wounds whether that are post-surgical or trauma-related should be protected during the healing process. Items such as but not limited to ointments and bandages are utilized to prevent infection and provide support of the area adjacent to the wound. Additionally, it is common to employ a device that will substantially inhibit the animal from licking or aggravating the wound site during the healing process. One known conventional item that is utilized is the protective cone. As is known in the art the protective cone is fastened around the neck of the animal so as to substantially reduce the ability for the animal to lick or reach the wound site as the cone is typically flared outwards proximate the head of the animal. These devices are typically made from a rigid material such as plastic. Many problems exist with this style of device. One problem is that the cone substantially inhibits the peripheral vision of the animal wearing the device. This limited vision combined with the discomfort of the rigid material can create significant discomfort and/or panic for the animal on which the cone has been placed. Another issue with these styles of existing devices is that these devices inhibit or substantially interfere with other tasks involved in the animal's daily routine. The rigid cones often make it difficult for an animal to eat or drink. Additionally, these rigid cones interfere with the animal's ability to lie down in a normal position.

Another existing device in the art is a doughnut style collar that is manufactured from an inflatable material or is manufactured from a thick foam or rubber material. These devices have inherent deficiencies as well as it pertains to the daily activities of the animal wearing the device. The doughnut style collars maintain the animal's neck in an unnatural position and further interfere with activities such as but not limited to sleeping or eating.

Accordingly, there is a need for a device that will substantially inhibit an animal from disrupting a wound site that is undergoing the healing process that does not interfere with the animals daily activities such as but not limited to sleeping or eating.

SUMMARY OF THE INVENTION

It is the object of the present invention to provide an animal movement restraint device that substantially inhibits the lateral rotation movement of the animal engaged therewith.

A further object of the present invention is to provide an animal movement restraint device that includes a neckband.

Another object of the present invention is to provide an animal movement restraint device that is operable to substantially inhibit the lateral rotation movement of the animal engaged therewith that further includes a lower torso band that is circumferentially mounted around the lower torso of the animal.

Still a further object of the present invention is to provide an animal movement restraint device that includes a first lateral member and a second lateral member that are secured intermediate the neck band and the lower torso band.

An additional object of the present invention is to provide an animal movement restraint device that substantially inhibits lateral rotational movement of an animal that further includes an upper mounting band that is operably connected to the first and second lateral members.

Yet another object of the present invention is to provide an animal movement restraint device that substantially inhibits lateral rotational movement of an animal that is adjustable.

A further object of the present invention is to provide an animal movement restraint device that substantially inhibits lateral rotational movement of an animal that is lightweight and comfortable.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
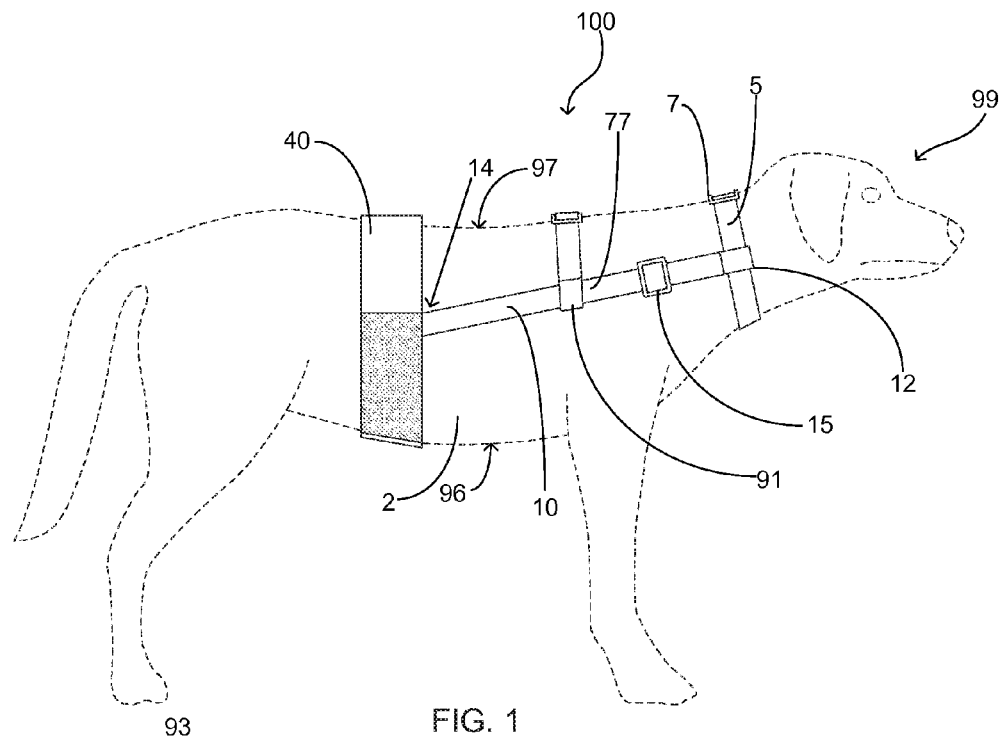
FIG. 1 is a right side view of an embodiment of the present invention engaged with an exemplary animal.

Referring now to the drawings submitted herewith, wherein various elements depicted therein are not necessarily drawn to scale and wherein through the views and figures like elements are referenced with identical reference numerals, there is illustrated a animal movement restraint device 100 constructed according to the principles of the present invention.

The animal movement restraint device 100 further includes a neckband 5. The neckband 5 is generally annular in shape and is operable to be surroundably mounted to an animal's neck. The neckband 5 is manufactured from a suitable durable material such as but not limited to nylon. The neckband 5 further includes an adjustment mechanism 7. The adjustment mechanism 7 functions to alter the diameter of the neckband 5 so as to securely fit the neckband 5 to the neck area of an exemplary animal 99. It is contemplated within the scope of the present invention that the neckband cold be used separately from the animal movement restraint device 100 as a conventional collar. Those skilled in the art will recognize that the neckband 5 could be manufactured in numerous different widths and/or encompass a variety of ornamental designs.

As shown in FIG. 1, a first side strap 10 is operably intermediate the neckband 7 and the lower torso strap 40. The first side strap 10 includes a first end 12 and a second end 14. The first end 12 is operably engaged with the neckband 5. The first end 12 of the first side strap 10 is formed in a loop and is operable to be surroundably mounted to the neckband 5. The first end 12 is movable along the neckband 5 so as to allow proper positioning thereof. The movable mounting of the first end 12 allows a user to properly fit the animal movement restraint device 100 to different size animals. It is contemplated within the scope of the present invention that the first end 12 could have fastened thereon a plastic ring or similar fastener so as to operably and movably engage with neckband 5.

The first side strap 10 is generally rectangular in shape and planar in manner being manufactured from a suitable durable material such as but not limited to nylon. The first side strap 10 further includes and adjustment buckle 15. The adjustment buckle 15 functions to alter the length of the first side strap 10. While no particular length range is required for the first side strap 10, good results have been achieved utilizing a first side strap 10 that is adjustable in length within the range of 6 to 25 inches. The second end 14 of the first side strap 10 is secured to the lower torso strap 40. The second end 14 is secured to the lower torso strap 40 utilizing suitable durable techniques such as but not limited to stitching. The second end 14 is positioned on the lower torso strap 40 such that it is proximate the midpoint between the exemplary animal's upper back 97 and the belly area 96. This placement position is preferred for maximizing the limitation of the rotational movement of the exemplary animal 99 as further discussed herein.

Figure 2:
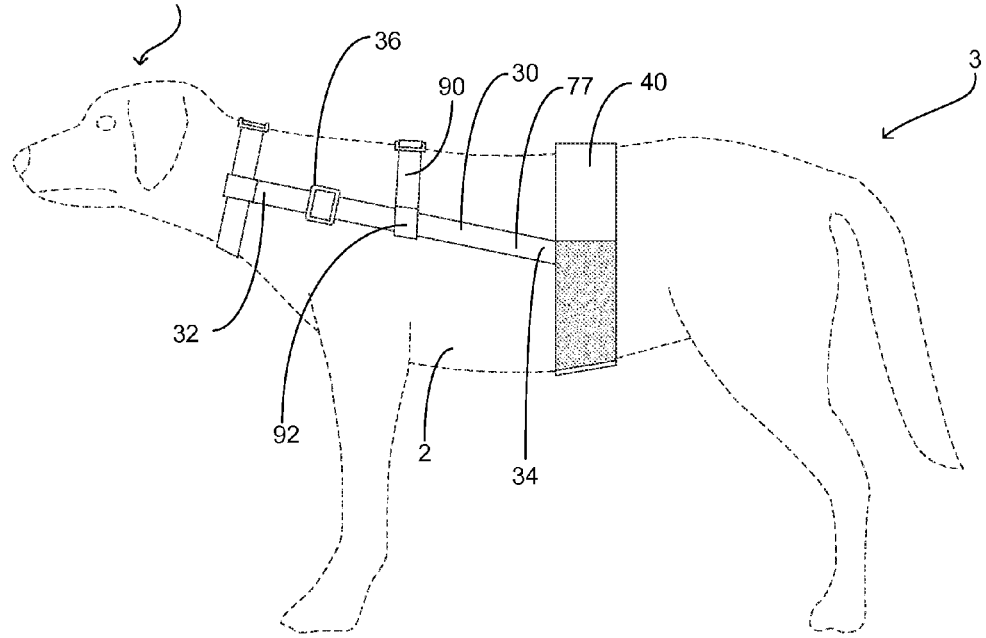
FIG. 2 is a left side view of an embodiment of the present invention engaged with an exemplary animal.
Figure 3:
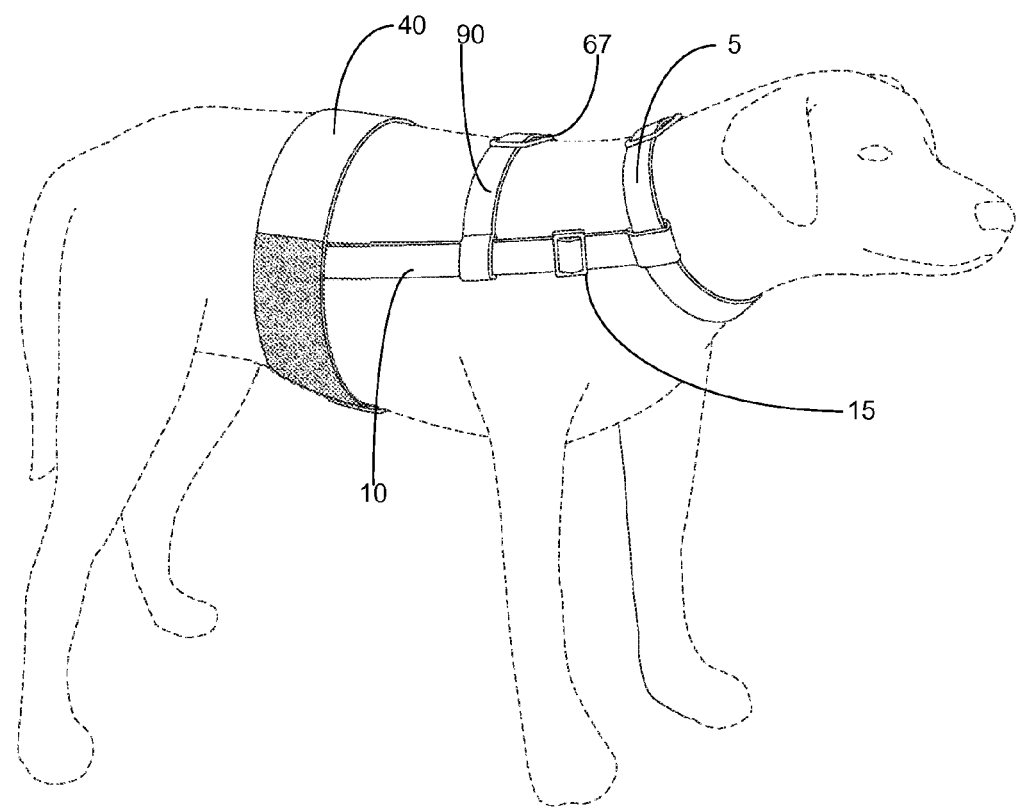
FIG. 3 is a perspective view of an embodiment of the present invention engaged with an exemplary animal.

As shown in particular in FIG. 2, the animal movement restraint device 100 further includes a second side strap 30. The second side strap 30 is constructed identically to the first side strap 10 as previously discussed herein. The second side strap 30 includes a first end 32 movably mounted to the neckband, a second end 34 secured to the lower torso strap 40 and an adjustment buckle 36 operable to adjust the length of the second side strap 30. The second side strap 30 is operable to limit rotational movement of the exemplary animal's head 93 in the direction towards the opposite side of the animal 99 to which the second side strap 30 is mounted. By way of example but not by way of limitation, if the second side strap 30 is mounted adjacent to the left side of the exemplary animal 99, subsequent the second side strap 30 being adjusted to the appropriate length, the exemplary animal 99 would have reduced ability to rotate its head 93 towards the right side of its body and in a generally rearward direction towards its posterior end 3. Alternatively, if the first side strap 10 is adjacent the right side of the exemplary animals body 2 subsequent the animal movement restraint device 100 being fastened to the exemplary animal 99, the exemplary animal 99 will have substantially reduced rotational movement of its head 93 towards the left side of the body towards the posterior end 3. While in the preferred embodiment of the animal movement restraint device 100 a first side strap 10 and a second side strap 30 are utilized, it is contemplated within the scope of the present invention that the animal movement restraint device 100 could include only the first side strap 10 or second side strap 30 in order to substantially inhibit the rotational movement of the exemplary animal's head 93 in the direction towards the side (and posterior end 3) of the body 2 opposite to which either side strap 77 is mounted.

An upper support strap member 90 is mounted intermediate the first side strap 10 and the second side strap 30 and is generally perpendicular thereto. The upper support strap member 90 is generally rectangular in shape and planar in manner. The upper support strap member 90 is manufactured from a suitable durable material such as but not limited to nylon. The upper support strap member 90 includes a first end 91 and a second end 92. The first end 91 is formed in a loop and is movably secure to the first side strap 10. The second end 92 of the upper support strap member 90 is movably secured to the second side strap 30. Those skilled in the art will recognize that numerous techniques and/or fasteners could be utilized to movably secured the first end 91 and second end 92. The upper support strap member 90 is movably secured intermediate the first side strap 10 and second side strap 30 so as to allow a user to arrange the upper support side strap member 90 in a position that provides support to the first side strap 10 and second side strap 30 and assists in maintaining an ideal position thereof. The upper support strap member 90 is designed to be moveably secured to the first side strap 10 and second side strap 30 so as to be moved along the upper back 97 in order to be positionable for exemplary animals 99 of different sizes. While only one upper support strap member 90 is illustrated herein, it is contemplated within the scope of the present invention that the animal movement restriction device 100 could utilize more than one upper support strap member 90. The upper support strap member 90 further includes an adjustment mechanism 67 that is operable to adjust the length of the upper support strap member 90 so as to improve the fit of the animal movement restraint device 100. Those skilled in the art will recognize that numerous types of fasteners could be utilized in order to provide adjustment of the length of the upper support strap member 90.

The lower torso strap 40 is surroundably mounted to the torso of the exemplary animal proximate it posterior end 3. The lower torso strap 40 is manufactured from a suitable durable material such as but not limited to nylon. The lower torso strap 40 is securely attached to the exemplary animal 99 utilizing hook and loop fasteners or other suitable durable techniques. The lower torso strap 40 functions as the anchoring mechanism for the first side strap 10 and the second side strap 30. Ensuing the surroundably mounting of the lower torso strap 40, which is secured, as previously described herein, the animal's rotational movement is substantially restricted. As the second end 14 of the first side strap 10 is secured to the lower torso strap 40, once the first side strap is adjusted in length such that there is substantially no slack in the first side strap 10 when the animal is in a neutral position as illustrated herein, an attempt by the exemplary animal 99 to rotate its head 97 in a direction toward the opposing side of the body 2 to which the first side strap 10 is mounted, the movement is substantially restricted as the tension on the first side strap 10 will inhibit the attempted movement. It should be understood that the same functionality is provided by the second side strap 30 to restrict the movement of the exemplary animals head 97 in the opposing direction as the first side strap 10. The width of the lower torso strap 40 functions to potentially serve as a pressure applicator for a bandage that may be present on a wound site in the lower torso area of the exemplary animal 99. Additionally, the width of the lower torso strap 40 functions to improve its ability to anchor the second ends 14, 34.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An animal movement restraint device releasably secured to an animal comprising:
   a first strap, said first strap being generally annular in shape, said first strap secured proximate the neck of an animal;
   a second strap, said second strap being surroundably mounted to the animal, said second strap being secured to the animal proximate the lower torso;
   a third strap, said third strap having a first end and a second end, said third strap being operably connected to said first strap and said second strap, said third strap being adjacent the torso of the animal, said third strap further including a buckle, said buckle operable to adjust the length of said third strap,
   a fourth strap, said fourth strap having a first end and a second end, said fourth strap being operably coupled to said first strap and said second strap, said fourth strap being mounted on the animals body on the opposing side from said third strap, said fourth strap further including a buckle, said buckle of said fourth strap operable to adjust the length of said fourth strap,
   a fifth strap, said fifth strap having a first end and a second end, said first end of said fifth strap being secured to said third strap, said second end of said fifth snap being secured to said fourth strap, said fifth strap extending between said third strap and said fourth strap wherein said fifth strap extends over an upper back of the animal only; and
   wherein said third strap and said fourth strap are operable to substantially inhibit the animal from turning their head and moving the head in a generally lateral and rearward direction.

2. The animal movement restraint device as recited in claim 1, wherein said third strap and said fourth strap are adjustable in length so as to limit the lateral and rearward movement of the animal's head.

3. The animal movement restraint device as recited in claim 2, wherein said second strap is greater in width that said first strap, said third strap and said fourth strap.

4. The animal movement restraint device as recited in claim 3, wherein said second strap is releasably secured to the animal proximate the lower torso area such that said second strap is substantially immovable along the body.

5. The animal movement restraint device as recited in claim 4, wherein the animal movement restraint device is made from nylon.

6. An animal movement restraint device operable to inhibit the complete rotation of an animals' head in a direction toward the lower torso comprising:
   a neckband, said neckband being generally annular in shape, said neck band being manufactured from a flexible material, said neckband being surroundably secured to the neck of the animal;
   a lower torso strap, said lower torso strap being circumferentially mounted to the lower torso region of the animal, said lower torso strap having a first end and a second end, said first end and said second end being releasably secured;
   a first side strap, said first side strap having a first end and a second end, said first end of said side strap being secured to said neckband, said second end of said side strap being secured to said lower torso strap, said first side strap being adjacent a side of the body of the animal, said first side strap further including an adjustment device, said adjustment device operable to adjust the length of said first side strap,
   a second side strap, said second side strap having a first end and a second end, said first end of said second side strap being secured to said neckband, said second end of said second side strap being secured to said lower torso strap, said second side strap mounted on the body of the animal on the opposing side from said first side strap, said second side strap further including an adjustment device, said adjustment device operable to adjust the length of said second side strap,
   a back strap, said back strap having a first end and a second end, said first end of said back strap being secured to said first side strap, said second end of said back strap being secured to said second side strap, said back strap positioned such that said back strap extends from said first side strap over an upper back area of the animal and terminates at said second side strap so as to encircle only the upper half of the animals torso.

7. The animal movement restraint device as recited in claim 6, wherein said first end of side first side strap is movably secured to said neckband.

8. The animal movement restraint device as recited in claim 7, wherein said first side strap and said second side strap are adjustable in length.

9. The animal movement restraint device as recited in claim 8, wherein said first end of said second side strap is movably secured to said neckband.

10. The animal movement restraint device as recited in claim 9, wherein the animal movement restraint device is manufactured from nylon.

11. An animal post surgical device operable to inhibit a dog from moving their head towards their lower torso region comprising:
    a neckband, said neckband being generally annular in shape, said neck band being manufactured from a flexible material, said neckband being surroundably secured to the neck of the animal;
    a lower torso strap, said lower torso strap being circumferentially mounted to the lower torso region of the animal, said lower torso strap having a first end and a second end, said first end and said second end being releasably secured;
    a first side strap, said first side strap having a first end and a second end, said first end of said side strap being secured to said neckband, said first side strap further including a buckle, said buckle operable to adjust the length of said first side strap, said second end of said side strap being secured to said lower torso strap, said first side strap being adjacent a side of the body of the animal;
    a second side strap, said second side strap having a first end and a second end, said first end of said second side strap being secured to said neckband, said second end of said second side strap being secured to said lower torso strap, said second side strap further including a buckle, said buckle operable to adjust the length of said side strap, said second side strap mounted on the body of the animal on the opposing side from said first side strap,
    a back strap, said back strap having a first end and a second end, said first end of said back strap being secured to said first side strap, said second end of said back strap being secured to said second side strap, said back strap secured such that said back strap extends intermediate said first side strap and said second side strap and only over the back of the animal.

12. The animal post surgical device as recited in claim 11, wherein said first side strap and said second side strap are adjustable in length.

13. The animal post surgical device as recited in claim 12, wherein said first end of said second side strap is movably secured to said neckband.

14. The animal post surgical device as recited in claim 13, wherein said first end of side first side strap is movably secured to said neckband.

15. The animal post surgical device as recited in claim 14, wherein said first end and said second end of said back strap are movably secured to said first side strap and said second side strap respectively.

* * * * *